W. J. BREWER.
ROLLER BEARING WHEEL.
APPLICATION FILED JULY 2, 1909.

956,279.

Patented Apr. 26, 1910.

Witnesses:
F. Martell
C. W. Lovell

Inventor
Wm J. Brewer
By his Attorney
Wm Bodge.

UNITED STATES PATENT OFFICE.

WILLIAM J. BREWER, OF BROOKLYN, NEW YORK.

ROLLER-BEARING WHEEL.

956,279. Specification of Letters Patent. Patented Apr. 26, 1910.

Application filed July 2, 1909. Serial No. 505,538.

*To all whom it may concern:*

Be it known that I, WILLIAM J. BREWER, subject of the King of England, and resident of Brooklyn, in the county of Kings and State of New York, have invented certain new and useful Improvements in Roller-Bearing Wheels, of which the following is a specification.

The invention relates to improvements in roller-bearing wheels or pulleys arranged for rotation upon a fixed axle or shaft; and the object of the same is to provide an antifriction roller-bearing of simple construction, capable of receiving and transmitting normal working stresses and adapted for operation in conjunction with auxiliary supporting or bearing surfaces for the moving parts to withstand more effectively the increased stresses incidental to shock from temporary overloading; and a further object includes certain construction for applying lubricant to the operating parts.

Figure 1:
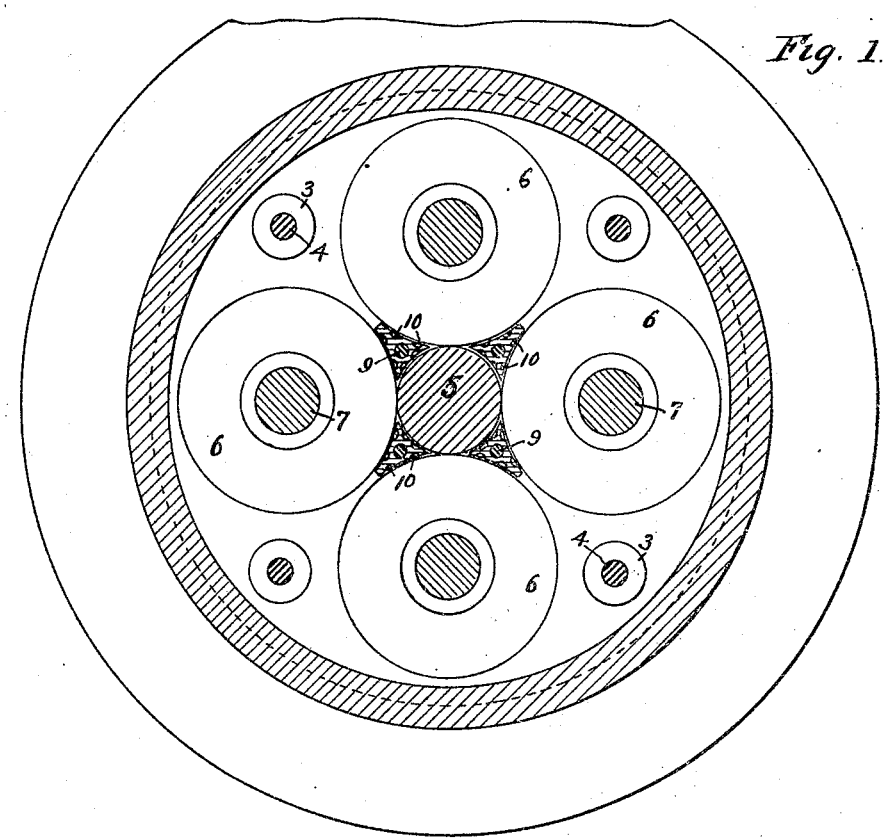
Figure 2:
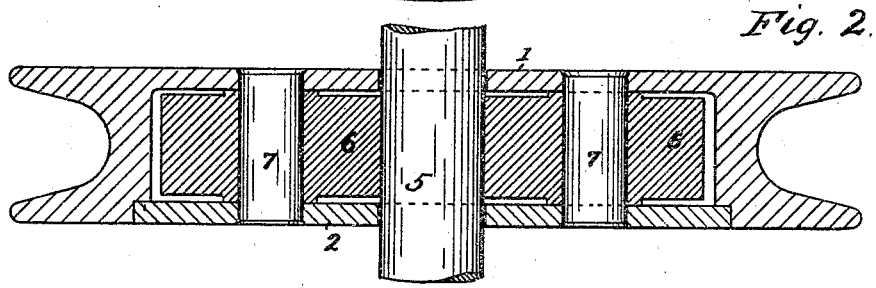
Figure 3:
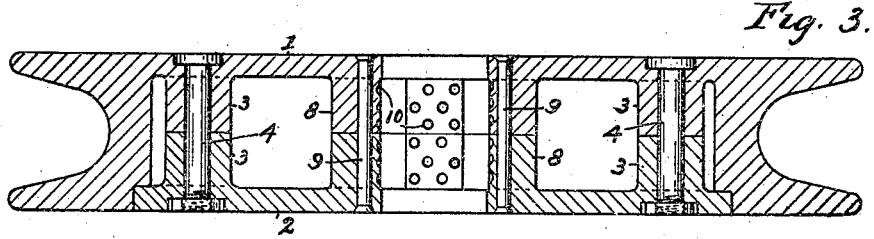

In describing the invention in detail reference is had to the accompanying drawings, forming part of this specification, and wherein like characters of reference are used to designate like parts throughout the several views, and in which:

Figure 1 is a side view, partially in section, of the improved wheel embodying my invention; Fig. 2, a transverse section through the body of the wheel and the rollers; and Fig. 3 is a transverse section showing the auxiliary bearing members.

The invention as herein shown is applied to a chambered sheave-wheel, having an integral side wall 1 and an oppositely-disposed separable side wall 2, both provided with interior brace-hubs 3 and secured together with cross-bolts 4, the end members of which are disposed in recesses to preserve a smooth exterior for the wheel. A central shaft or axle 5 is loosely embraced by the side walls of the wheel and also engaged by a series of rollers 6, mounted within the wheel-chamber for loose rotation upon the spindles 7, the latter being fixed in the side walls of the wheel. Extending through the chamber of the wheel and adjacent the rollers and central shaft are a series of transverse bearing-bars 8, integral with the side walls and provided with cross-ties 9 for additionally securing the side walls together. Recesses or pockets 10 for receiving and distributing a lubricant are provided in the bearing-faces of the bearing-bars adjacent the rollers and central shaft, these faces being so disposed as to merely clear such adjacent parts when the wheel is working under a normal load to permit of its free and frictionless rotation.

Upon the application to the wheel of a sudden or abnormal load of sufficient amount to cause abrasion between the rollers and shaft, the bearing-bars will be engaged by such members and temporarily present an increased bearing-surface for the transmission of such stress to the shaft, thereby diminishing the direct pressure between the rollers and shaft to increase the durability thereof.

Lubricant may be supplied to the wheel-chamber through a suitably-arranged opening (not shown), and by the rotation of the wheel its distribution will be effected over the several bearing surfaces and operative parts, the pockets in the bearing-bars serving to increase the distribution.

What I claim as my invention and desire to secure by Letters Patent, is:—

1. In a roller-bearing wheel, the combination with an axle or shaft, a chambered wheel-body mounted thereon, rollers rotatable in the body and engageable with the shaft, and laterally-extending bearing-bars between the side walls of the body having faces adapted for incidental engagement with the axle and the periphery of the rollers.

2. In a roller-bearing wheel, the combination with an axle or shaft, a chambered wheel-body mounted thereon, rollers rotatable in the body and engageable with the shaft, and laterally-extending bearing-bars between the side walls of the body having recessed faces adapted for incidental engagement with the axle and periphery of the rollers.

3. In a roller-bearing wheel, the combination with an axle or shaft, a chambered wheel-body mounted thereon and provided with separable side walls, oppositely-disposed abutting brace-hubs formed on the side walls, bolt-connections extending through said brace-hubs, rollers rotatable in the body and engageable with the shaft, laterally-extending bearing-bars between the side walls of the body having faces adapted for incidental engagement with the axle and the periphery of the rollers, and cross-ties extending through the bearing-bars and engaging the side walls of the wheel.

4. In a roller-bearing wheel, the combination with an axle or shaft, a chambered wheel-body mounted thereon and provided with separable side walls, oppositely-disposed abutting brace-hubs formed on the side walls, bolt-connections extending through said brace-hubs, rollers rotatable in the body and engageable with the shaft, laterally-extending bearing-bars between the side walls of the body having recessed faces adapted for incidental engagement with the axle and the periphery of the rollers, and cross-ties extending through the bearing-bars and engaging the side walls of the wheel.

Signed at city of Troy, in the county of Rensselaer and State of New York this 26 day of June A. D. 1909.

WILLIAM J. BREWER.

Witnesses:
FRANK J. DAVIS,
MARGARET DAVIS.